(12) United States Patent
Nelson et al.

(10) Patent No.: US 7,915,558 B2
(45) Date of Patent: Mar. 29, 2011

(54) CIRCUIT BREAKER WITH ARTICULATING CONTROL CABINET

(75) Inventors: Carl D. Nelson, Beaver, PA (US); Douglas A. Herman, Sewickley, PA (US)

(73) Assignee: Mitsubishi Electric Power Products, Inc., Warrendale, PA (US)

(*) Notice: Subject to any disclaimer, the term of this patent is extended or adjusted under 35 U.S.C. 154(b) by 489 days.

(21) Appl. No.: 11/837,988

(22) Filed: Aug. 13, 2007

(65) Prior Publication Data

US 2009/0045892 A1    Feb. 19, 2009

(51) Int. Cl.
*H01H 33/08* (2006.01)
*H01H 9/02* (2006.01)
*H01H 13/04* (2006.01)

(52) U.S. Cl. ........................ 218/155; 335/202
(58) Field of Classification Search .......... 335/202; 218/155
See application file for complete search history.

(56) References Cited

U.S. PATENT DOCUMENTS

| | | | | |
|---|---|---|---|---|
| 3,171,920 A | * | 3/1965 | Klein et al. | 335/69 |
| 3,525,835 A | * | 8/1970 | Norden | 200/446 |
| 3,590,188 A | * | 6/1971 | Frink et al. | 218/43 |
| 3,903,387 A | * | 9/1975 | Sasaki et al. | 218/45 |
| 4,506,408 A | * | 3/1985 | Brown | 16/225 |
| 4,788,392 A | * | 11/1988 | Asai | 218/44 |
| 4,999,937 A | * | 3/1991 | Bechtold | 40/610 |
| 5,059,753 A | * | 10/1991 | Hamm | 218/84 |
| 5,323,131 A | * | 6/1994 | Castonguay | 335/68 |
| 5,503,497 A | * | 4/1996 | Dudley et al. | 403/103 |
| 5,747,766 A | * | 5/1998 | Waino et al. | 218/140 |
| 5,808,532 A | * | 9/1998 | DiVincenzo et al. | 335/68 |
| 6,307,172 B1 | * | 10/2001 | Bolin et al. | 218/155 |
| 6,628,095 B1 | * | 9/2003 | McKinnon et al. | 318/3 |
| 6,806,800 B1 | * | 10/2004 | Castonguay et al. | 335/68 |
| 7,323,958 B2 | * | 1/2008 | Auque et al. | 335/202 |
| 2002/0113040 A1 | * | 8/2002 | Imamura et al. | 218/43 |

* cited by examiner

*Primary Examiner* — Elvin G Enad
*Assistant Examiner* — Alexander Talpalatskiy
(74) *Attorney, Agent, or Firm* — Orrick, Herrington & Sutcliffe LLP

(57) ABSTRACT

A circuit breaker is provided having three horizontal circuit breakers coupled together with a base housing. Each of the horizontal circuit breakers comprising a tank secured in the housing, first and second current transformers extending from the tank and exit and entrance insulators extending from the first and second current transformers. The housing is mountable on a support frame. To facilitate shipping and field assembly, the circuit breaker includes an control panel moveably coupled to the housing.

14 Claims, 3 Drawing Sheets

CIRCUIT BREAKER WITH ARTICULATING CONTROL CABINET

FIELD

The present invention relates to circuit breakers and, more particularly, to circuit breakers having a moveably coupled control panel to facilitate shipping and field installation.

BACKGROUND

Gas insulated high voltage circuit breakers are typically located at high voltages electrical distribution sub-stations that generate strong electromagnetic radiation. A common high voltage circuit breaker is the three-pole circuit breaker shown in FIGS. 1 and 2. As depicted, the high voltage circuit breaker 10 typically includes three horizontal circuit breakers 12 coupled together with a base housing 16. Each of the horizontal circuit breakers 12 comprises a tank 14 secured in the housing 16, first and second current transformers 20 and 21 extending from each tank 14 and exit and entrance insulators 18 and 19 extending from the first and second current transformers 20 and 21. The housing 16 is mountable on a support frame 40.

Presently in a circuit breaker of this size, the breaker controls are wired to a cabinet or control panel 30 which is rigidly connected to the housing 16 or the breaker 12 itself at a height reachable by an operator O or other personnel on the ground and well below the height of the live parts of the breaker 10. Because of the total height H extending from the base of the control panel 30 to the top of the highest extending insulators 18 and 19 tends to be greater than the maximum height restrictions on highways, the control panel 30 and its bushings are typically removed for shipment from factory to the customer. As a result, field installation of wiring and bushings are required, as well as the cleaning and inspection of the breaker interior and vacuum treatment, before breaker use. Such installation is time consuming and costly, typically requiring five days for a utility crew and one manufacturer's technician to install the breaker 10 at the customer's site.

It is desirable to provide a circuit breaker and control panel assembly that facilitates shipping and reduces the complexity of the field installation.

SUMMARY

Embodiments provided herein are directed to a circuit breaker having three horizontal circuit breakers coupled together with a base housing. Each of the horizontal circuit breakers comprising a tank secured in the housing, first and second current transformers extending from the tank and exit and entrance insulators extending from the first and second current transformers. The housing is mountable on a support frame. In a preferred embodiment, the circuit breaker includes a control panel that is moveably coupled to the housing. The coupling can be a freely movable or rotatable coupling such as a hinge or the like to freely move relative to the housing or can be an articulating coupling to enable moving the control panel to predetermined positions with the range of motion of the coupling. The circuit breaker further includes flexible wiring and gas conduits coupled to the control panel and each of the horizontal circuit breakers.

BRIEF DESCRIPTION OF FIGURES

The figures provided herein are not necessarily drawn to scale, with some components and features being exaggerated for clarity. Each of the figures diagrammatically illustrates aspects of the invention. Variation of the invention from the embodiments pictured is contemplated.

DESCRIPTION

Each of the additional features and teachings disclosed below can be utilized separately or in conjunction with other features and teachings to produce a circuit breaker with a movable control panel. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Figure 1:
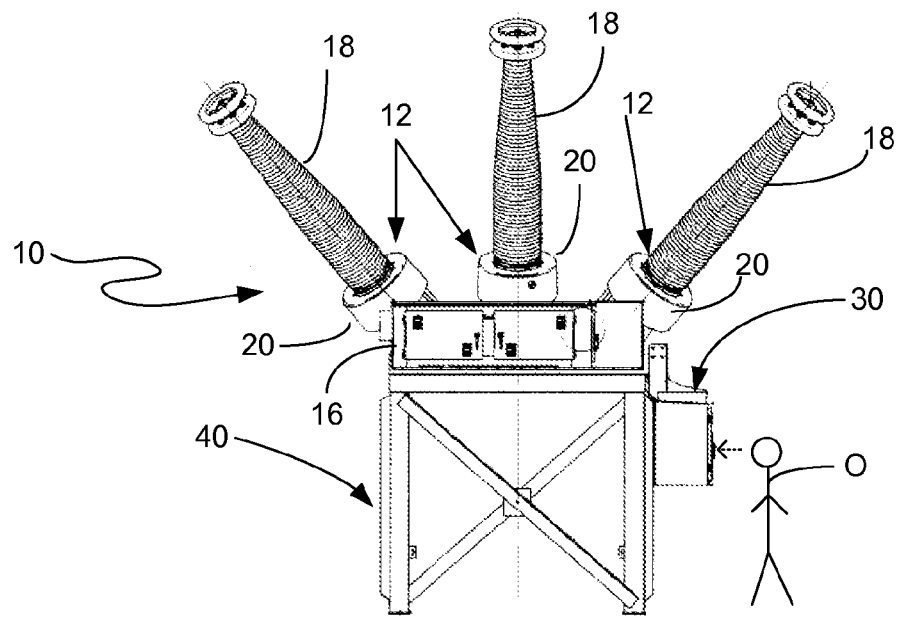
FIG. 1 is a front elevation view of a conventional circuit breaker mounted on a support from and having a control panel extending below the circuit breaker to a height readable by an operator.
Figure 2:
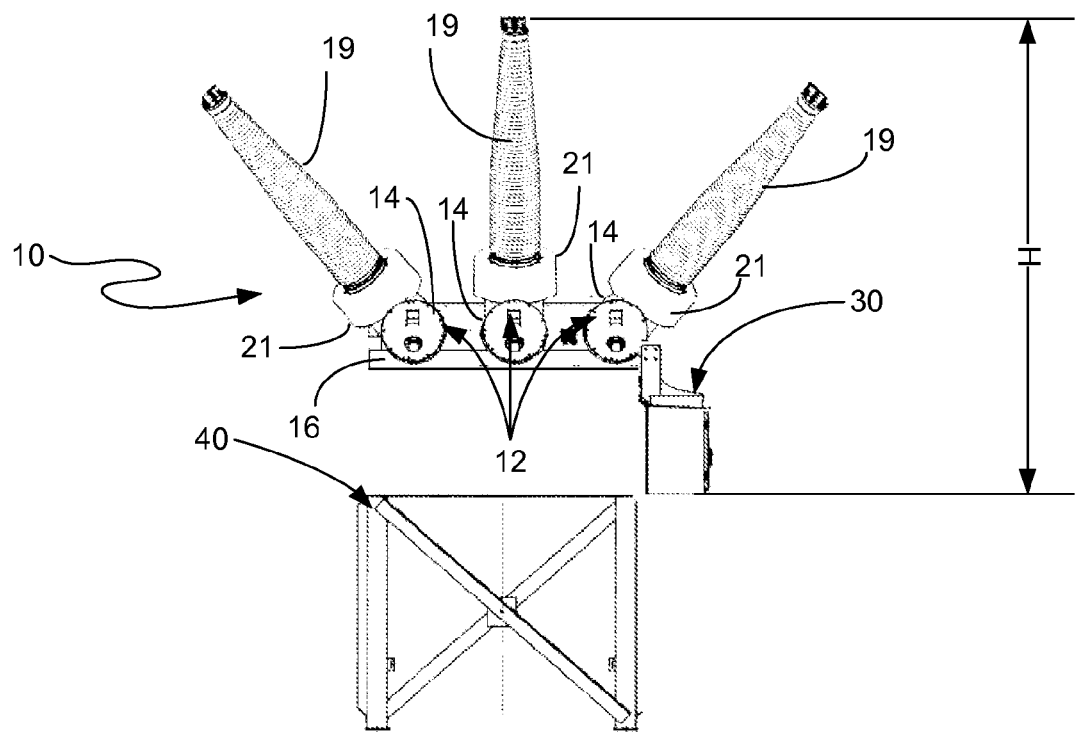
FIG. 2 is a rear elevation exploded assembly view of the conventional circuit breaker shown in FIG. 1.
Figure 3:
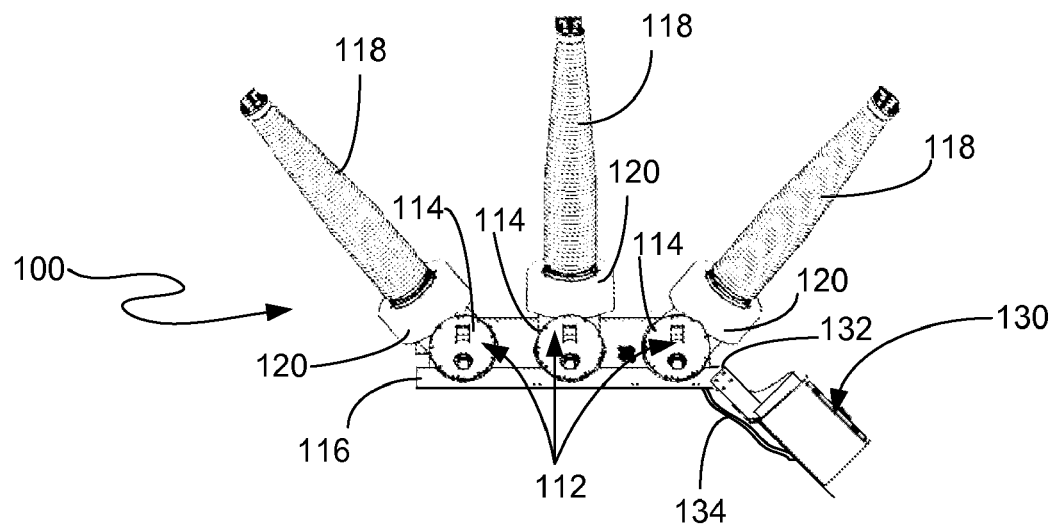
FIG. 3 is a front elevation view of a preferred embodiment of a circuit breaker having a moveably coupled control pane.
Figure 4:
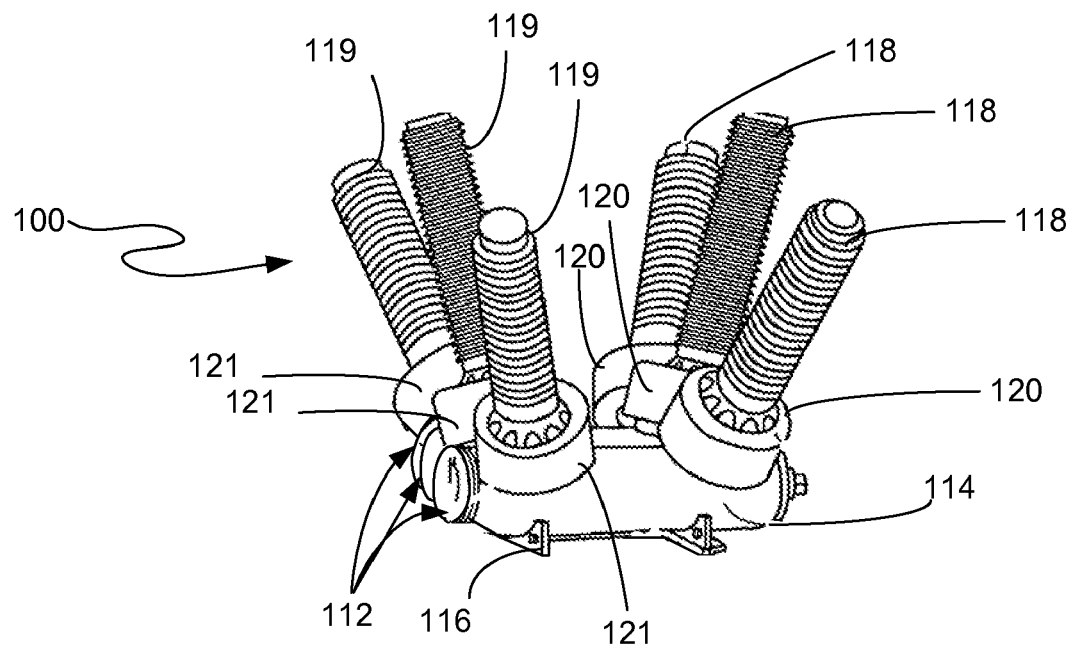
FIG. 4 is a perspective view of the circuit breaker shown in FIG. 3.
Figure 6A:
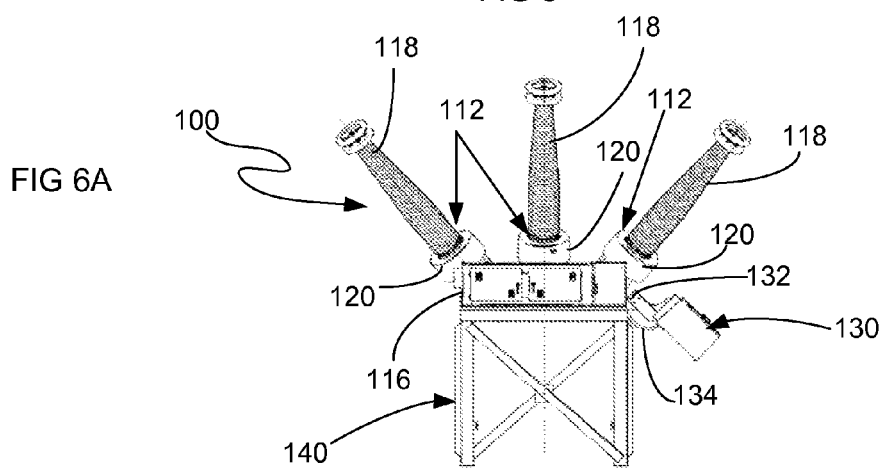
FIGS. 6a and 6b are front elevation views showing the circuit breaker in FIG. 3 being installed on a support frame.

Improved systems and methods are provided herein for a high voltage circuit breaker that facilitates shipping and field installation, while reducing the complexity of the installation procedures. Referring in detail to the figures, a preferred embodiment of the circuit breaker 100 is shown in FIGS. 3 and 4. As depicted, the circuit breaker 100 is a three pole circuit breaker having three horizontal circuit breakers 112. The horizontal circuit breakers 112 are coupled to one another within a housing 116. Each horizontal circuit breaker 112 includes a tank 114 secured in the housing 114 and first and second current transformers 118 and 119 extending from the tank 114. Extending from the first and second current transformers 188 and 119 are exit and entrance insulators 120 and 121 respectively. As with conventional circuit breakers, the housing 116 is mountable on a support frame (see FIGS. 6a and 6b).

In a preferred embodiment, as shown in FIG. 3, the circuit breaker 100 includes a control panel 130 that is moveably coupled to the housing 116. As depicted, the control panel 130 is positioned at an angle that is greater than zero degrees and less than ninety degrees relative to the horizontal axis defined by the frame of the housing 116. The coupling 132 can be a freely movable coupling such as a hinge or hinges or the like to enable the control panel 130 to be freely moved relative to the housing 116. Alternatively, the coupling 132 can be articulating coupling such as a ratchet hinge or the like that enables the control panel 130 to be moved to predetermined positions within the range of motion of the couple. The circuit breaker 100 further includes flexible wiring and gas conduits 134 coupled to the control panel 130 and each of the horizontal circuit breakers 112.

Figure 5:
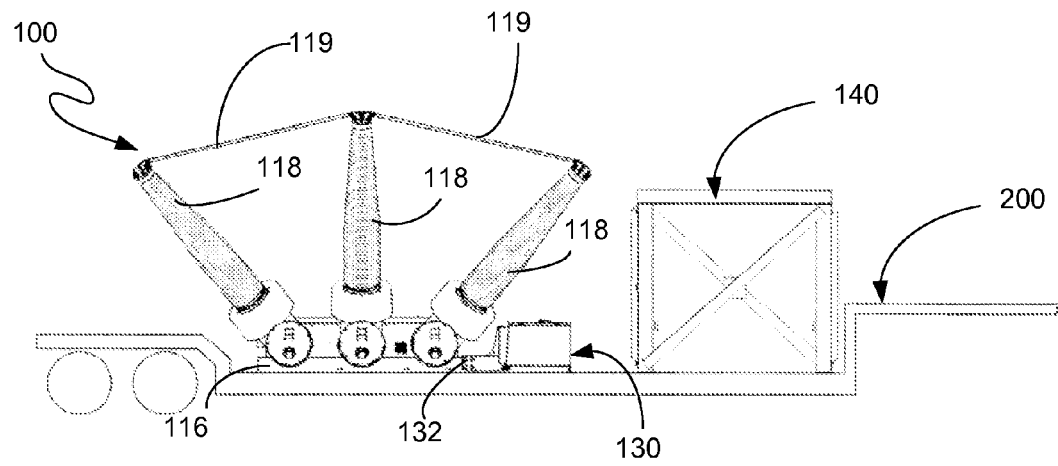
FIG. 5 is a front elevation view showing the circuit breaker in FIG. 3 and a support frame mounted on a flat bed trailer ready for transport.

As depicted in FIG. 5, for shipping the control panel 130 is rotated to an "up" position, i.e., to the same or about the same plane as the frame of the housing 166 or at an angle of about zero degrees relative to the horizontal axis defined by the frame of the housing 116. With the insulators 118 secured with tension rods 119, the circuit breaker 100 is mounted on a flat bed trailer 200 along with a separately loaded a support frame 140.

Figure 6B:
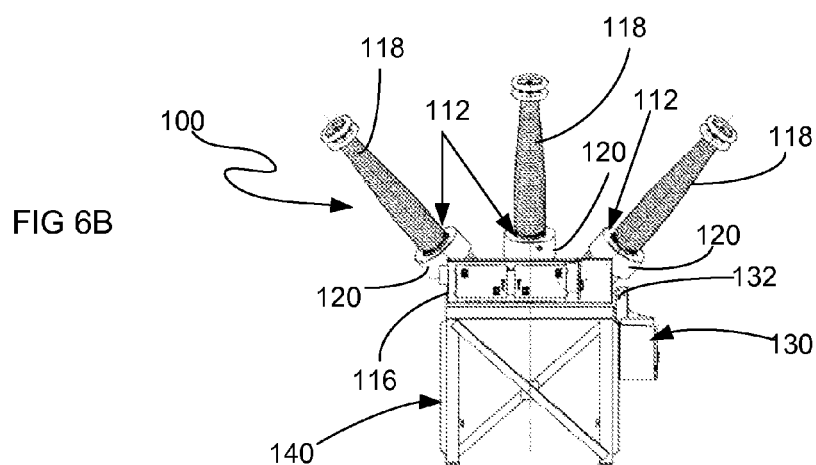

Once at the customer's site, the circuit breaker 100 is mounted on the support frame 140. The panel 130 is then lowered toward it's "down" or operational position, i.e., at an angle of about ninety degrees relative to the horizontal axis defined by the frame of the housing 116 as shown in FIG. 6b.

In this embodiment, the control panel 130 is advantageously movable for shipment while maintaining the connection of the control wiring and the like. The articulation of the panel 130 and the connection with flexible wiring conduit 134 reduces the total height of the shippable package while allowing the panel 130 to be simply hinged down and fastened in place at the customer's site. As a result, no wiring or bushing installation is required before use of the breaker, nor is there a need to clean and inspect the interior of the breaker 100 and vacuum treatment. Also, by maintaining the panel 130 in an attached configuration with the circuit breaker 100 while in the shipping or "up" position allows the breaker 100 and control panel 130 to be lifted, secured, stored and installed as a single item, rather than multiple pieces. Field installation of the circuit breaker 100, which used to require five days for a utility crew and one manufacturer's technician for installation at the customer's site, can now be done by a smaller crew, with no manufacturer's personnel, in 1 to 2 days.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed:

1. In a high voltage circuit breaker system comprising a three pole circuit breaker having three horizontal circuit breakers coupled to one another within a housing, wherein each horizontal circuit breaker includes a tank secured in the housing and first and second current transformers extending from the tank, and exit and entrance insulators extending from the first and second current transformers, the improvement comprising
   a control panel having an enclosure,
   flexible electrical conduit extending from the enclosure to the circuit breaker electrically connecting the control panel to the circuit breaker, and
   a moveable coupling coupled to the housing of the circuit breaker and the enclosure of the control panel to moveably couple the control panel and the enclosure to the housing of the circuit breaker.

2. The circuit breaker system of claim 1 wherein the moveable coupling is a rotatable coupling.

3. The circuit breaker system of claim 1 wherein the moveable coupling is a hinge.

4. The circuit breaker system of claim 1 wherein the moveable coupling is an articulating coupling.

5. The circuit breaker system of claim 4 wherein the articulating coupling is a ratchet hinge.

6. The circuit breaker system of claim 1 further comprising a support frame couplable to the housing.

7. In a high voltage circuit breaker comprising first, second and third circuit breakers, a housing coupling the first, second and third circuit breakers, wherein each circuit breaker includes a tank secured in the housing, first and second current transformers extending from the tank, and exit and entrance insulators extending from the first and second current transformers, the improvement comprising
   a control panel having an enclosure,
   flexible electrical conduit extending from the enclosure to each of the first, second and third circuit breakers electrically connecting the control panel to the circuit breakers, and
   a moveable coupling coupled to the housing of the circuit breakers and the enclosure of the control panel to moveably couple the control panel and the enclosure to the housing of the circuit breakers.

8. The circuit breaker of claim 7 wherein the moveable coupling is a rotatable coupling.

9. The circuit breaker of claim wherein the moveable coupling is a hinge.

10. The circuit breaker of claim 7 wherein the moveable coupling is an articulating coupling.

11. The circuit breaker of claim 10 wherein the articulating coupling is a ratchet hinge.

12. The circuit breaker of claim 7 wherein the circuit breaker is a 3 pole circuit breaker.

13. The circuit breaker of claim 7 wherein the first, second and third circuit breakers are horizontal circuit breakers.

14. The circuit breaker system of claim 7 further comprising a support frame couplable to the housing.

* * * * *